United States Patent
Chao et al.

(10) Patent No.: US 6,236,720 B1
(45) Date of Patent: May 22, 2001

(54) DISTRIBUTED SUBSCRIBER ADJUNCT SERVICES SYSTEM

(75) Inventors: Edward T. Chao, Morris Plains, NJ (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/187,957

(22) Filed: Nov. 6, 1998

(51) Int. Cl.[7] .................................................. H04M 3/42
(52) U.S. Cl. .......................... 379/201; 379/199; 379/207
(58) Field of Search .............................. 379/67.1, 88.11, 379/88.13, 88.21, 142, 199, 201, 207

(56) References Cited

U.S. PATENT DOCUMENTS

| | | | |
|---|---|---|---|
| 5,524,140 | * 6/1996 | Klausner et al. | 379/67 |
| 5,717,742 | * 2/1998 | Hyde-Thomson | 379/88 |
| 5,719,922 | * 2/1998 | Bremer et al. | 379/88 |
| 5,737,395 | * 4/1998 | Irribarren | 379/88.13 |

* cited by examiner

*Primary Examiner*—Ahmad Matar
*Assistant Examiner*—Bing Bui
(74) *Attorney, Agent, or Firm*—Duft, Graziano & Forest, P.C.

(57) ABSTRACT

The distributed subscriber adjunct services system functions to implement a distributed presence of the subscriber adjunct service over the extent of a telecommunication network. The subscriber can thereby access the functionality of their home subscriber adjunct services system via a local call connection yet directly obtain access to their subscriber agent in their standard access mode. The telecommunication network service node that the subscriber accesses receives the necessary subscriber data, control messages and the like from the subscriber agent of the subscriber adjunct services system by data networking via a standard telecommunication transfer protocol, such as TCP/IP via the Internet or an Intranet. This data communication connection enables the local telecommunication network service node to realize the functionality of the subscriber adjunct service system without the need for a long distance call connection to the subscriber's home telecommunication network service node.

15 Claims, 2 Drawing Sheets

DISTRIBUTED SUBSCRIBER ADJUNCT SERVICES SYSTEM

FIELD OF THE INVENTION

This invention relates to subscriber adjunct service systems, such as voice mail message systems, and in particular to a distributed subscriber adjunct services system that provides the subscriber adjunct services interface on a distributed basis to enable the subscriber to access the functionality of the subscriber adjunct service system via a local call even though the subscriber's adjunct service system and its information content is remotely located from the subscriber.

Problem

It is a problem in field of providing subscriber adjunct services that the apparatus that implements the subscriber adjunct service function is co-located with the particular telecommunication network service node that is used to provide the subscriber with basic telecommunication services. The adjunct service systems include, but are not limited to: voice mail systems, voice dialing systems, intelligent personal agents, electronic receptionist, and the like. Thus, when the subscriber travels away from the area served by the subscriber's home telecommunication network service node, the subscriber adjunct services can be accessed only by the establishment of a long distance call connection from the subscriber's present location to the subscriber's home telecommunication network service node. With the increasing reliance on subscriber adjunct services, the number of long distance call connections required to maintain the typical subscriber in contact with the multitude of subscriber adjunct services represents an unacceptable expense.

The typical subscriber adjunct service comprises a subscriber agent that maintains the subscriber data and logic for the system operation and is typically colocated with the telecommunication network service node that is used to provide the subscriber interface. For example, the subscriber interface in a voice mail system provides voice prompts, interprets the subscriber input data and plays the voice mail that is stored in the voice mail system for the subscriber. When a subscriber is traveling at a distance from their normal geographic home location, the subscriber must dial a long distance call to the subscriber adjunct system to retrieve their messages, access their personal voice dialing lists, intelligent personal agents, electronic receptionist, and the like, since the telecommunication network service node local to the subscriber does not have access to any of the data that comprises the subscriber's adjunct services.

Solution

The above described problems are solved and a technical advance achieved by the present distributed subscriber adjunct services system that functions to implement a distributed presence of the subscriber adjunct service over the extent of a telecommunication network. The subscriber can thereby access the functionality of their home subscriber adjunct services system via a local call connection yet directly obtain access to their subscriber agent in their standard access mode. The telecommunication network service node that the subscriber accesses receives the necessary subscriber data, control messages and the like from the subscriber agent of the subscriber adjunct services system by data networking via a standard telecommunication transfer protocol, such as TCP/IP via the Internet or an Intranet. This data communication connection enables the local telecommunication network service node to realize the functionality of the subscriber adjunct service system without the need for a long distance call connection to the subscriber's home telecommunication network service node.

DETAILED DESCRIPTION

Figure 1:
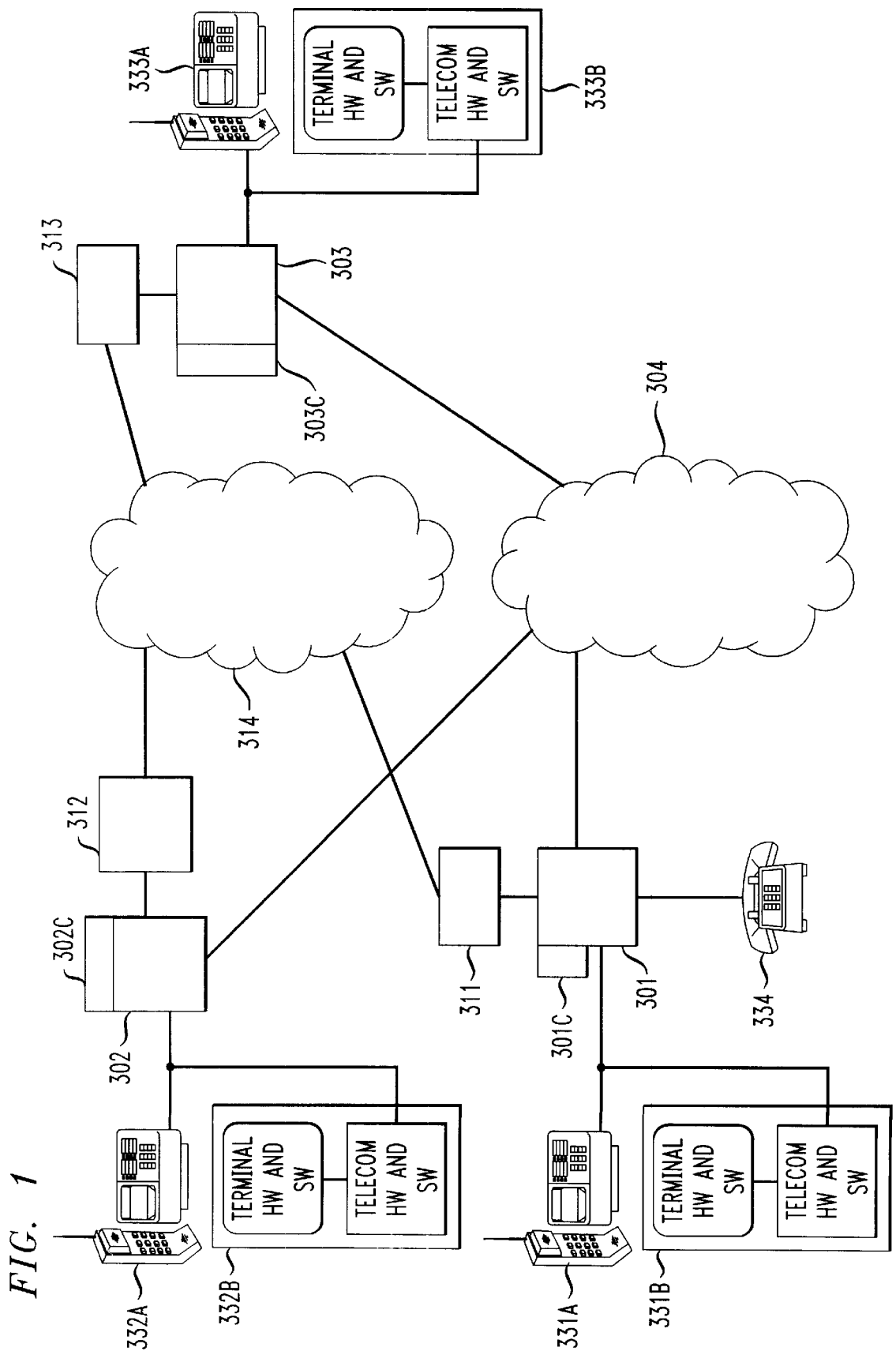
FIG. 1 illustrates in block diagram form the overall architecture of an electronic message switching system that includes the present distributed subscriber adjunct services system.
Figure 2:
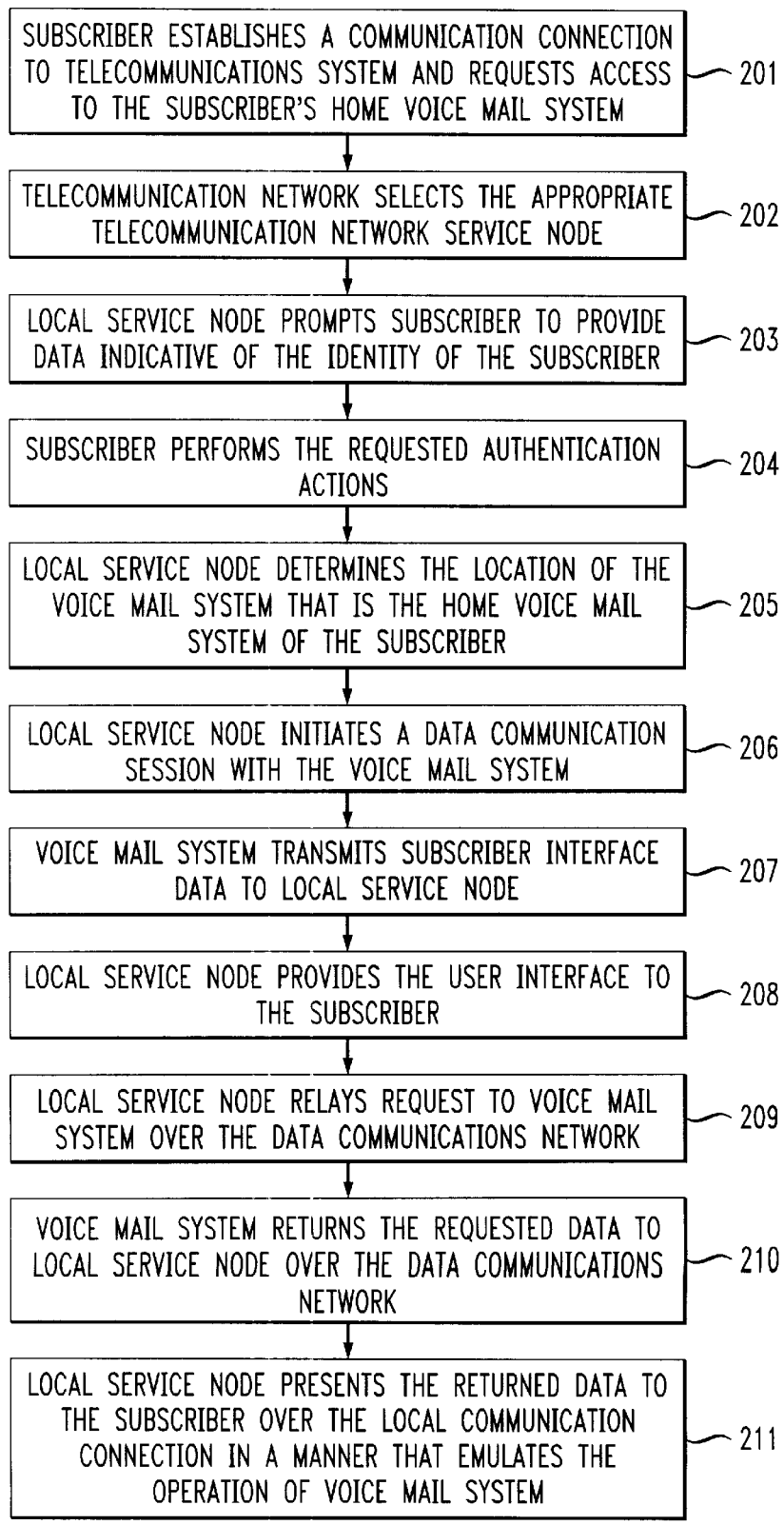
FIG. 2 illustrates in flow diagram form the operation of the present distributed subscriber adjunct services system to access a remotely located subscriber adjunct services system.

FIG. 1 illustrates in block diagram form the overall architecture of a typical combination of a telecommunications network (such as the Public Switched Telephone Network (PSTN)) and data communications network that is equipped with the present distributed subscriber adjunct services system, while FIG. 2 illustrates in flow diagram form the operation of the present distributed subscriber adjunct services system in that communications network architecture. In particular, the telecommunications network comprises a plurality of local telecommunications systems 301–303 that are part of the Public Switched Telephone Network (PSTN), which are interconnected via trunk circuits to an Interexchange Carrier System (IXC) 304. Each of the telecommunications systems 301–303 serve a plurality of telephone stations 331A–333A,334, which can optionally be equipped with personal computer 331 B–333B and other communication equipment, and the telecommunications systems 301–303 may be interconnected via an out of band signaling link through the lnterexchange Carrier System (IXC) 304, using the well known SS7 signaling protocol or through a separate data communications network 314, such as Internet, frame relay network, private switched network, packet switched network and the like. The operation of such a telecommunications network is well known and is not described in detail herein. In addition, while not illustrated in FIG. 1, the subscriber can be equipped with a wireless communication device and served by a Mobile Switching Center as is well known in communications technology. In order to simplify the following description, the traditional wired communications environment is used to illustrate the operation of the present distributed subscriber adjunct services system.

The telecommunications systems 301–303 also provide a set of features and services to the terminal devices that they serve in response to control signals that are received from the terminal devices. The telecommunications systems 301–303 are all equipped with distributed subscriber adjunct services systems 311–313, that are operational in conjunction with control software 301C–303C operational in the respective telecommunications systems 301–303. The data communications network 314 interconnects a plurality of distributed subscriber adjunct services systems 311–313, each of which serves a plurality of subscribers, and can comprise a part of the lnterexchange Carrier System 304, or can be the Internet, or any type of private data communication network. For the purpose of illustrating the operation of the present distributed subscriber adjunct services system, the data communications network 314 is shown as a separate element to simplify the description.

Distributed Subscriber Adjunct Services System

The distributed subscriber adjunct services system comprises two major functional entities: a subscriber agent that maintains the subscriber data, logic, service control; and a service node that provides the subscriber interface over a voice or data traffic channel. As shown in FIG. 1, one node of the distributed subscriber adjunct services system, for example, can comprise a service node 302C resident in telecommunications system 302 and an associated subscriber agent 312 connected thereto. The two functional entities need not both be provided at each network node, in that a network node can be equipped with a service node and not a subscriber agent. The basic architecture of the present distributed subscriber adjunct services system is to enable a subscriber to access a local service node, through which the subscriber is connected to the features and services of the subscriber's home subscriber agent.

The various service nodes 301C–303C are connected to each other via a data networking protocol and any telecommunication network service node can be used to support any subscriber and any subscriber adjunct service. This is accomplished by dynamically distributing the subscriber requested subscriber adjunct service through the telecommunication network in a manner to transparently provide the subscriber with the requested service, yet in a manner to use the capabilities of the telecommunication network in an efficient manner.

Operation of the Distributed Subscriber Adjunct Services System

FIG. 2 illustrates in flow diagram form an example of the operation of the present distributed subscriber adjunct services system to enable a subscriber to obtain access to a remotely located subscriber adjunct services system through a local communication connection. A subscriber has a home location on the telecommunication network of FIG. 1, which comprises the telecommunications system 301, that provides the subscriber with communication services at the subscriber line assigned to this subscriber. The subscriber is also provided with at least one adjunct subscriber service, such as voice mail, through an adjunct subscriber service system 311 that is connected to the home telecommunication system (network service node) 301. The adjunct subscriber service systems 311–313 include, but are not limited to: voice mail systems, voice dialing systems, intelligent personal agents, electronic receptionist, and the like. For the purpose of this description, it is assumed that the subscriber is provided with voice mail service via a voice mail system 311 that is associated with the subscriber's home telecommunication system 301. As is well known, the subscriber at step 201 can access the voice mail service from the subscriber line and some sort of security screening is provided by the voice mail system 311 to prevent unauthorized access to the subscriber's voice mail messages. The voice mail system 311 comprises a subscriber adjunct service system in the present distributed subscriber adjunct services system and serves to maintain a set of administrative data regarding the subscriber and the related service offering, such as: identity of the subscriber, subscriber password, prerecorded voice mail greeting, subscriber line number, type of service authorized, and the like. In addition, the voice mail system 311 stores the messages that are input to the voice mail system 311 by callers who cannot reach the subscriber and who wish to leave a message. There are numerous voice mail systems presently in use in the existing Public Switched Telephone Network and these typically have slightly different operating procedures and capabilities. Furthermore, the subscriber-specific information associated with voice mail service presently resides on only the home location voice mail system 311 and is unavailable for use unless the subscriber establishes a communication connection to this home location voice mail system 311.

The present distributed subscriber adjunct services system enables the subscriber to access the home location voice mail system 311 from a remote location in a transparent manner by providing a local service node that functions to emulate the operation of the home location voice mail system 311 in a transparent manner so the subscriber does not have to vary their voice mail access procedure. For example, when a subscriber is located at a terminal device 333A that is remotely located from the subscriber's home telecommunication system 301, the subscriber can access the home voice mail system 311 by originating a call to the telecommunication network service node 303C of the telecommunications system 303 that serves terminal device 333A at step 201. To provide a requested subscriber adjunct service, the telecommunication network at step 202 selects the appropriate telecommunication network service node to provide the requested subscriber interface function as part of the requested adjunct subscriber service. The telecommunication network can select a local service node 303C or can establish a communication connection via a toll free number to the nearest telecommunication network service node that can provide the requested service.

For example, the subscriber activates terminal device 333A to establish a communication connection to telecommunications system 303 in conventional manner and requests access to the subscriber's home voice mail system using a predefined feature access code. The identity of the subscriber must be ascertained at this juncture to enable the telecommunications system 303 to provide the requested service. The local service node 303C accomplishes this by prompting the subscriber at step 203 to provide data indicative of the identity of the subscriber. The subscriber performs the requested authentication actions at step 204 by providing a password, security code or the like in well known fashion to enable the local service node 303C to determine the identity of the subscriber. At step 205, the local service node 303C uses the received subscriber identification data to determine the location of the voice mail system 311 that is the home voice mail system of the subscriber. At step 206, the local service node 303C initiates a data communication session over the data communications network 314 with the voice mail system 311 that is part of the subscriber's home voice mail system. The voice mail system 311, in response to receipt of subscriber identification data, transmits subscriber interface data at step 207 to local service node 303C so that the local service node 303C can perform the subscriber interface functions in a manner that is substantially identical to the mode of operation on the voice mail system 311. The local service node 303C at step 208 provides the user interface to the subscriber and identifies the data that the subscriber is requesting from the voice mail system 311. This information is relayed by voice mail system 311 to the local service node 303C over the data communications network 314 at step 209 so that the voice mail system 311 can return the requested data at step 210 to the local service node 303C over the data communications network 314. At step 211, the local service node 303C presents the returned data to the subscriber over the local communication connection in a manner that emulates the operation of voice mail system 311.

In this manner, the distributed subscriber adjunct services system provides a secure and efficient mode of providing a subscriber with access to their home location features, data and services via the use of a local call to a telecommunication network service node that is local to the subscriber's present location. The local service node can emulate the operation of the subscriber's home subscriber adjunct services system by coordinating the transfer and distributing the processing of the data contained therein. It is expected that the data from the subscriber's home subscriber adjunct services system can be exported to an intermediary processing node that performs the requested data access and data processing services, such that the local telecommunication network service node simply provides the user interface function. This embodiment represents a multi-level hierarchical implementation of the distributed subscriber adjunct services system.

Alterative Considerations

On calls originated by the subscriber agent to the subscriber, the telecommunication network service node can be selected to be the telecommunication network service node at which the subscriber was last active. For a wireless subscriber, this subscriber location can be determined by a Mobile Application Part (MAP) interface to the subscriber's home location register, since the home location register defines the last known location of the subscriber in the telecommunication network. In addition, the Mobile Application Part (MAP) interface to the home location register could provide mobile active or inactive status to the distributed subscriber adjunct services system, which could be used in the decision regarding an attempt to deliver the call to the subscriber. For wireline services, a similar result can be achieved by time of day schedules, last know location of the subscriber, and the like. Furthermore, the subscriber interface functionality can be separated from the data processing functionality, in that a local processor can implement the subscriber interface while all of the data conversion and data processing functions can be implemented at a centralized location.

Summary

The distributed subscriber adjunct services system functions to implement a distributed presence of the subscriber adjunct service over the extent of a telecommunication network. The subscriber can thereby access the functionality of their home subscriber adjunct services system via a local call connection yet directly obtain access to their subscriber agent in their standard access mode. The telecommunication network service node that the subscriber accesses receives the necessary subscriber data, control messages and the like from the subscriber agent of the subscriber adjunct services system by data networking via a standard telecommunication transfer protocol.

What is claimed:

1. A distributed subscriber adjunct service system operational in a communications network that interconnects a plurality of communications systems, for providing subscriber services at remotely located communications systems sites for a service requesting subscriber, comprising:

means, located at a home location communications system that serves said service requesting subscriber, for providing a predefined subscriber adjunct service for said service requesting subscriber;

means, operational in a communications system located remotely from said home location communications system and serving a communication device, responsive to said service requesting subscriber requesting access from said communication device to said means for providing a predefined subscriber adjunct service, for establishing a data communication connection from said communication device to said means for providing a predefined subscriber adjunct service;

means for exchanging data between said means for providing a predefined subscriber adjunct service and said means for establishing a data communications connection; and means, operational in said communications system located remotely from said home location communications system, for emulating operation of said means for providing a predefined subscriber adjunct service for said communication device that is connected to said communications system located remotely from said home location communications system.

2. The distributed subscriber adjunct service system of claim 1 wherein said means for establishing a data communications connection comprises:

means for determining the identity of said service requesting subscriber.

3. The distributed subscriber adjunct service system of claim 2 wherein said means for establishing a data communications connection further comprises:

means, responsive to a determined identity of said service requesting subscriber, for identifying said means for providing a predefined subscriber adjunct service; and means for establishing a data communications session with said identified means for providing a predefined subscriber adjunct service via said data communication connection.

4. The distributed subscriber adjunct service system of claim 3 wherein said means for establishing a data communications connection further comprises:

means, responsive to a received request for adjunct services received from said service requesting subscriber, for retrieving data required to service said request from said means for providing a predefined subscriber adjunct service via said data communication connection.

5. The distributed subscriber adjunct service system of claim 4 wherein said means for emulating operation of said means for providing a predefined subscriber adjunct service comprises:

means, responsive to said retrieved data, for providing said requested service using said retrieved data to said service requesting subscriber.

6. A distributed subscriber adjunct service system, operational in a telecommunications network that comprises a plurality of telecommunication systems, for providing subscriber services at a remotely located one of said plurality of telecommunication systems for a service requesting subscriber, comprising:

subscriber adjunct service means, located at a one of said telecommunication systems that is a home location for said service requesting subscriber, for providing a predefined subscriber adjunct service for said service requesting subscriber;

subscriber agent means, operational in a one of said plurality of telecommunication systems located remotely from said subscriber adjunct service means and responsive to said service requesting subscriber requesting access from a communication device served by said one of said plurality of telecommunication systems located remotely from said subscriber adjunct service means to said subscriber adjunct service means, for establishing a data communication connection from said communication device to said subscriber adjunct service means;

data communication means for exchanging data between said subscriber adjunct service means and said subscriber agent means; and means, located in said subscriber agent means, for emulating operation of said subscriber adjunct service means for said communication device that is connected to said communications system located remotely from said home location communications system.

7. The distributed subscriber adjunct service system of claim 6 wherein said subscriber agent means comprises:

means for determining the identity of said service requesting subscriber.

8. The distributed subscriber adjunct service system of claim 7 wherein said subscriber agent means further comprises:

means, responsive to a determined identity of said service requesting subscriber, for identifying said subscriber adjunct service means; and means for establishing a data communications session with said identified subscriber adjunct service means via said data communication means.

9. The distributed subscriber adjunct service system of claim 8 wherein said subscriber agent means further comprises:

means, responsive to a received request for adjunct services received from said service requesting subscriber, for retrieving data required to service said request from said subscriber adjunct service means via said data communication means.

10. The distributed subscriber adjunct service system of claim 9 wherein said means for emulating operation of said subscriber adjunct service means comprises:

means, responsive to said retrieved data, for providing said requested service using said retrieved data to said service requesting subscriber.

11. A method, operational in a telecommunications network that comprises a plurality of telecommunication systems, for providing a predefined subscriber adjunct service at remotely located sites for a service requesting subscriber from a subscriber adjunct service system, located at a one of said telecommunication systems that is a home location for said service requesting subscriber, comprising the steps of:

establishing, in response to said service requesting subscriber requesting access from a communication device served by a one of said plurality of telecommunication systems located remotely from said subscriber home location to said subscriber adjunct service system, a data communication connection from a subscriber agent, located in said one of said plurality of telecommunication, systems located remotely from said subscriber home location and serving said service requesting subscriber, to said subscriber adjunct service system;

exchanging data between said subscriber adjunct service system and said subscriber agent system; and emulating, in said subscriber agent system, operation of said subscriber adjunct service system for said communication device that is connected to said telecommunications system located remotely from said home location communications system.

12. The method of claim 11 wherein said step of establishing comprises:

determining the identity of said service requesting subscriber.

13. The method of claim 12 wherein said step of establishing further comprises:

identifying, in response to a determined identity of said service requesting subscriber, said subscriber adjunct service system; and establishing a data communications session with said identified subscriber adjunct service system via said data communication connection.

14. The method of claim 13 wherein said step of establishing further comprises:

retrieving, in response to a received request for adjunct services received from said service requesting subscriber, data required to service said request from said subscriber adjunct service system via said data communication connection.

15. The method of claim 14 wherein said step of emulating operation of said subscriber adjunct service system comprises:

providing, in response to said retrieved data, said requested service using said retrieved data to said service requesting subscriber.

* * * * *